US007472095B2

(12) United States Patent
Huelsbergen et al.

(10) Patent No.: US 7,472,095 B2
(45) Date of Patent: Dec. 30, 2008

(54) METHODS AND APPARATUS FOR AUTOMATIC CLASSIFICATION OF TEXT MESSAGES INTO PLURAL CATEGORIES

(75) Inventors: Lorenz Huelsbergen, Lebanon, NJ (US); S. Shehryar Qutub, Hoffman Estates, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 270 days.

(21) Appl. No.: 11/305,300

(22) Filed: Dec. 16, 2005

(65) Prior Publication Data
US 2007/0143236 A1   Jun. 21, 2007

(51) Int. Cl.
G06F 15/18 (2006.01)
G06E 1/00 (2006.01)
(52) U.S. Cl. .............................. 706/20; 706/48; 706/18
(58) Field of Classification Search .................. 706/20, 706/48, 18
See application file for complete search history.

(56) References Cited

U.S. PATENT DOCUMENTS

| 2002/0137507 A1 | 9/2002 | Winkler |
| 2003/0046421 A1 | 3/2003 | Horvitz et al. |
| 2005/0044487 A1* | 2/2005 | Bellegarda et al. .......... 715/511 |
| 2005/0060643 A1* | 3/2005 | Glass et al. ............... 715/501.1 |

* cited by examiner

*Primary Examiner*—Joseph P. Hirl
*Assistant Examiner*—Adrian L Kennedy

(57) ABSTRACT

Systems and techniques for classification of incoming text messages into categories. An initial set of categories is created and populated with a set of initial messages in each category. Incoming messages are assigned to a category based on text analysis of the incoming message and analysis of dissimilarities and differences between the message and messages already in the category. A set of unclassified messages is also maintained for incoming messages that do not fit an established category. Periodically, unclassified messages are reassigned to one of the established categories or to new categories created based on analysis of the unclassified messages.

20 Claims, 8 Drawing Sheets

FIG. 3A

| HOUSE RENTALS (302) | VACATION SITE ADVERTISEMENTS (304) | COLLECTORS ITEMS - LAMPSHADES (306) | DIGITIZED SONGS (308) | OVERFLOW (310) |
|---|---|---|---|---|
| BEAUTIFUL 4 BDRM 2 BTH FOR RENT MH NEIGHBORHOOD | VACATION IN THE BAHAMAS FOR $300/MO. CALL 435-567-8912 FOR DETAILS | ANTIQUE SHADES VICTORIAN ERA DESIGNS | JANIS JOPLIN DIGITAL RECORDING...DOWNLOAD FOR FREE | |
| 2 BD 2 BATH CONDO FOR LEASE IN CONVENIENT DOWNTOWN MORRISTOWN, NJ | HOLIDAY CAMPSITE BAJA CALIFORNIA EMAIL JR@BAJACAMP.COM FOR DETAILS | SHADES&SHADES... COLLECTORS ITEMS PAR EXCELLENCE | BEATLES MP3 AUDIOS... 60 CENTS FOR 100 SONGS | |
| LOW RENT IN HIGH RENT AREA 2 BED 2 BATH IN MH, NJ WILL NEGOTIATE RENT | RELAX IN SUNNY CALIFORNIA LA BEACHSIDE. GREAT VACATION LOCATION. CALL 456-123-4565 FOR DETAILS | LAMPSHADES FROM THE GOLD RUSH! A MUST SEE | DIGITIZED RECORDINGS...ELVIS'S EARLY SONGS...FREE!!! SEE ELVIS-SONGS.COM | |
| BEAUTIFUL 4 BDRM RENTAL IN MORRIS TOWNSHIP. NO PETS. LEASE TERMS NEGOTIABLE. CALL 223-456-5678 AFTER 6 PM | VACATION CAMPSITE IN SAN FRANCISCO; TOP HOLIDAY LOCALE IN CALIFORNIA. EMAIL SUE@SF.COM FOR DETAILS | NEW LAMPS...OLD SHADES...ALL SHAPES AND SIZES | BEAUTIFUL MELODIES ELIZABETHAN ERA DIGITIZED...DOWNLOAD FOR FREE | |

FIG. 3B

| MESSAGE | CATEGORY |
|---|---|
| 3 BD 2 BTH APARTMENT RENTAL IN MANHATTAN, NY RENT NEGOTIABLE | HOUSE RENTALS |
| HOLIDAY IN MAINE TOP CAMPSITE CALL 234-231-1234 | VACATION SITE ADVERTISEMENTS |
| LAMPS & SHADES FROM THE 30s!!! | COLLECTORS ITEMS - LAMPSHADES |
| LINDA'S BEST DIGITIZED DOWNLOAD FOR FREE! | DIGITIZED SONGS |
| CALL ME A COUCH POTATO | OVERFLOW |
| A ROSE BY ANY OTHER NAME IS STILL A ROSE | OVERFLOW |

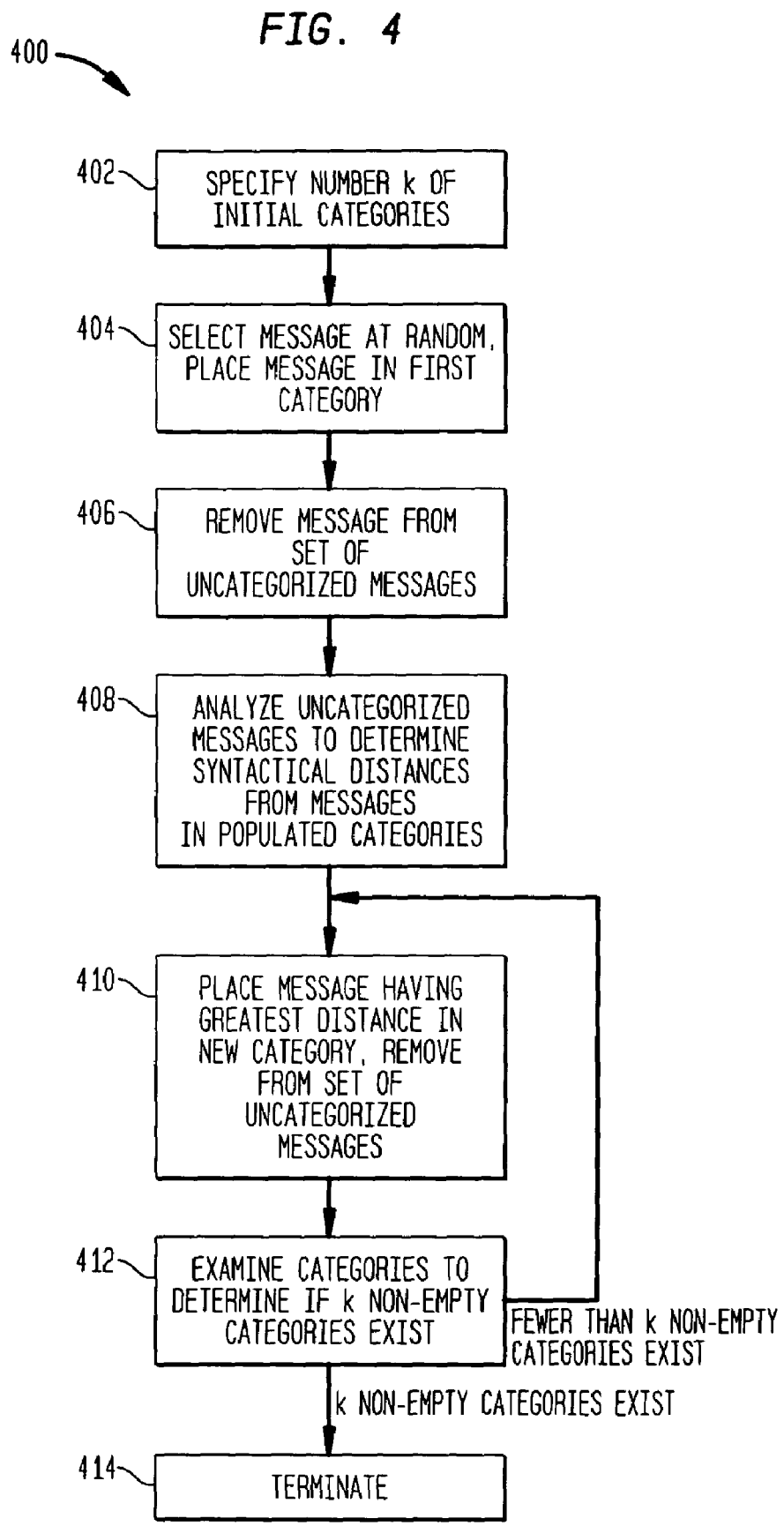

METHODS AND APPARATUS FOR AUTOMATIC CLASSIFICATION OF TEXT MESSAGES INTO PLURAL CATEGORIES

FIELD OF THE INVENTION

The present invention relates generally to improved systems and techniques for text communication. More particularly, the invention relates to systems and techniques for automatic classification of incoming text messages into plural categories.

BACKGROUND OF THE INVENTION

Text communication using electronic devices has been widely used for a considerable length of time. Electronic mail and instant messaging between computers are very widely available, and widely used. In addition, portable wireless electronic devices, such as cellular telephones, have adopted instant messaging techniques both for the delivery of email and for delivery of instant messages originating from another cellular telephone or some other wireless device. One extremely popular technique used by cellular telephone systems for message delivery is short messaging service, or SMS. SMS messages are typically relatively short and are often subject to a specified character limit. They are typically delivered as nearly instantaneously as possible.

As text messaging in cellular telephones and similar devices gains in popularity, users who employ such services regularly can expect to receive more and more such messages. Receiving and dealing with a text message requires time and attention from the user. Some messages, such as bulk commercial messages about products in which a user has no interest, are not desired at all. Other messages may be of great interest to a user, so that a user wishes to give them priority over other messages. Still other messages may be of interest, but may be of a lower priority for a user, so that the user would like to be able to defer their delivery to a desired time window. Numerous other ways of managing messages would be of interest to users, provided that messages could be reliably classified in ways corresponding to the interest they were likely to hold for a particular user.

SUMMARY OF THE INVENTION

Among its several aspects, the present invention addresses such issues by providing for creation of topical categories of messages and classification of incoming messages into categories. An initial set of categories is created, either manually by an operator or by automatic analysis of an initial set of seed messages. Messages from the initial set of seed messages are assigned to the categories as the categories are created. According to one aspect of the invention, new messages are assigned to each category based on a computation of probability of proper assignment of the new message to the category, based on comparisons of syntactic characteristics of the messages making up the category and the new message. Numerous syntactic criteria exist, along with numerous ways of analyzing messages in order to analyze and associate messages using the syntactic criteria. One such method of computation is by clustering of messages in accordance with tokens shared by the messages. A token may consist of a combination of elements of a message, such as combinations of consecutive characters. Messages are examined for such combinations, and distances between messages are computed based on sharing of combinations. Once a definition for a token has been chosen, incoming messages may be assigned to categories by comparing the tokens present in an incoming message with tokens in messages already assigned to the category.

In addition, a set of unclassified messages may be maintained, and when the size of the set of unclassified messages meets a predefined criterion, the messages in the set are divided among the established categories, new categories are created, or both.

Labeling of categories may be performed manually. Alternatively, categories may be labeled by the use of selected tokens. Tokens may be selected according to frequency of use. For example, the most frequently occurring token in a category, or concatenated groups of tokens selected according to frequency criteria, may be selected as a label for the category. A service provider or a user may establish criteria for admitting or rejecting messages or for assigning priorities to messages, and messages may be admitted, rejected or assigned higher or lower priorities according to the categories into which they are classified.

A more complete understanding of the present invention, as well as further features and advantages, will be apparent from the following Detailed Description and the accompanying drawings.

BRIEF DESCRIPTION OF THE DRAWINGS

FIG. 3A illustrates a plurality of message categories that can be evaluated using systems and techniques according to an aspect of the present invention;

FIG. 3B illustrates a plurality of messages assigned to message categories using systems and techniques according to an aspect of the present invention;

FIG. 4 illustrates a process of automatic initial category creation according to an aspect of the present invention;

DETAILED DESCRIPTION

The present invention will be described more fully hereinafter with reference to the accompanying drawings, in which several exemplary embodiments of the invention are shown. This invention may, however, be embodied in various forms and should not be construed as limited to the embodiments set forth herein.

Figure 1:
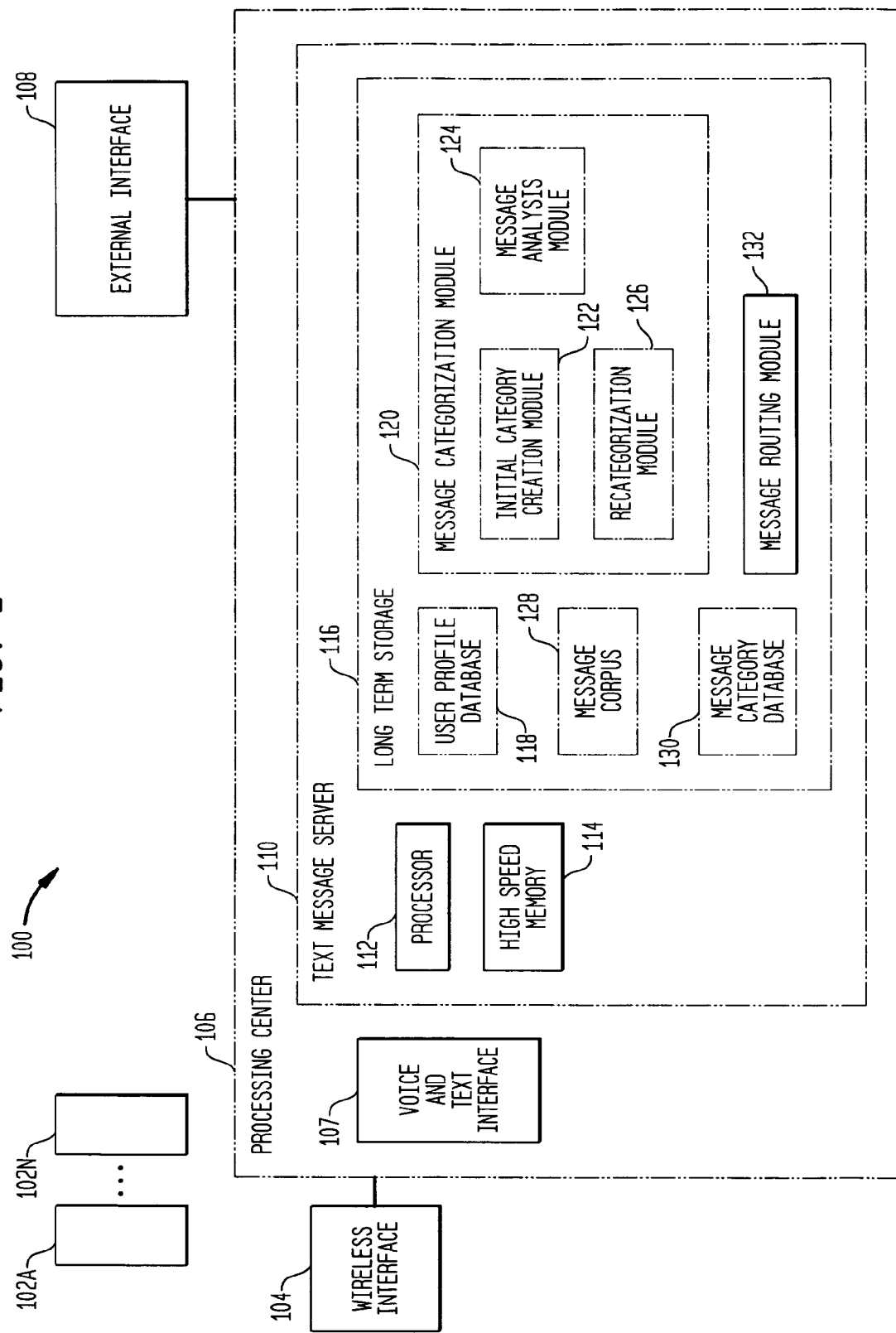
FIG. 1 illustrates a wireless telephone system employing text messaging using message categorization according to an aspect of the present invention.

FIG. 1 illustrates a wireless communication system 100 according to an aspect of the present invention. The system 100 includes a plurality of wireless telephones 102A, . . . ,102N, communicating with one another, and with external devices, through a wireless interface 104. The wireless interface 104 communicates with a processing center 106, which manages voice and text communication, performs needed data processing and otherwise manages the operation of the system 100. The processing center 106 is also connected to an external interface 108, which provides a connection to communication devices outside of the system 100, for example to landline telephone systems and to devices communicating through the Internet.

The processing center 106 includes a voice and text interface 107, which receives all voice and text communication from the wireless interface 104 and the external interface 108. The voice and text interface 107 receives incoming voice and text communications and directs them to appropriate elements of the processing center 106 as appropriate for proper processing and analysis.

The processing center 106 includes one or more servers to provide voice and data processing and routing necessary for the operation of the system 100. Of particular interest is a text message server 111. The server 111 includes a suitably programmed processor 112, high speed memory 114 and long term storage such as a hard disk 116. The server 110 provides text message services including management, routing and filtering of incoming text messages. Only one server 110 is shown here as providing text message services, but in a large system such as the system 100, many servers such as the server 110 may be present, providing similar services in parallel with one another.

The server 110 hosts or has access to a user profile database 118. Each user profile includes an address for routing of a text message to the user, as well as a set of user preferences relating to messages to be delivered to the user. The preferences may suitably include a listing of one or more message categories, and actions to be taken with respect to messages in each category. Actions may include rejecting a message, delivering the message only during a specified time interval, assigning a low priority to the message so that it is delivered only if messages having a higher priority have been delivered and assigning a higher priority to the message, so that it is delivered before messages having a lower priority.

The server 110 hosts a message categorization module 120, suitably implemented as software hosted on the hard disk 116 and transferred to high speed memory 114 for execution by the processor 112 as needed. The message categorization module suitably employs a Bayesian analysis to assign messages to categories. Any desired number of categories may be created and employed.

The message categorization module 120 includes an initial category creation module 122, a message analysis module 124 and a recategorization module 126, all suitably implemented as software hosted on the hard disk 116 and transferred to high speed memory 114 for execution by the processor 112 as needed. The initial category creation module 122 creates a set of initial categories by partitioning a set of seed messages from a corpus 128 into a set of categories. The categories and their included messages are suitably stored in a message category database 130. As new messages arrive, they are processed and assigned to appropriate categories. Once a message has been assigned to a category, it is routed according to user preferences. A message routing module 132 consults the user profile database 118 and retrieves the user profile for the user to whom the message is addressed. The user preferences for the various categories are examined and the routing of the message is performed according to the user preferences for the category to which the message has been assigned. For example, a commercial message that is not in a desired category may be discarded or a message from a friend may be given a high priority.

Once a message has been routed or otherwise disposed of, it is preferably retained in the message category database 130 to provide statistical data for use in assigning new messages and deciding whether and how to create new categories. The message categories include actual categories for use, and an overflow category that is initially empty. Messages are assigned to the overflow category if they do not meet the criteria for assignment to one of the categories for use. However, when certain specified criteria are met, for example, when the overflow category grows to a certain specified size relative to the sizes of the actual categories for use, the recategorization module 126 operates to assign messages in the overflow category to one of the other categories, or to create new categories.

The categories may simply be topical categories established by human operators, or may be created through the use of clustering of messages. Clustering of messages may suitably be accomplished by analyzing each message to identify tokens and associating messages together into a cluster based on the similarity of the tokens shared between messages. That is, two messages are placed together in a cluster if the number of tokens they share, and the similarity of tokens, meets or exceeds some predefined criterion.

If manual category creation is to be performed, an operator may simply examine the corpus 128, define categories, and assign messages to each category. If automatic category creation is to be performed, the initial category creation module 122 suitably employs the process 200 of FIG. 3, discussed below, which yields categories such that messages in different categories have the maximum achievable mutual syntactic distance, or dissimilarity. In addition to categories that are to be initially populated and used for analysis, an overflow category, empty at the time of initialization, is created for incoming messages that do not meet qualifications for assignment to any of the existing categories.

Figure 2:
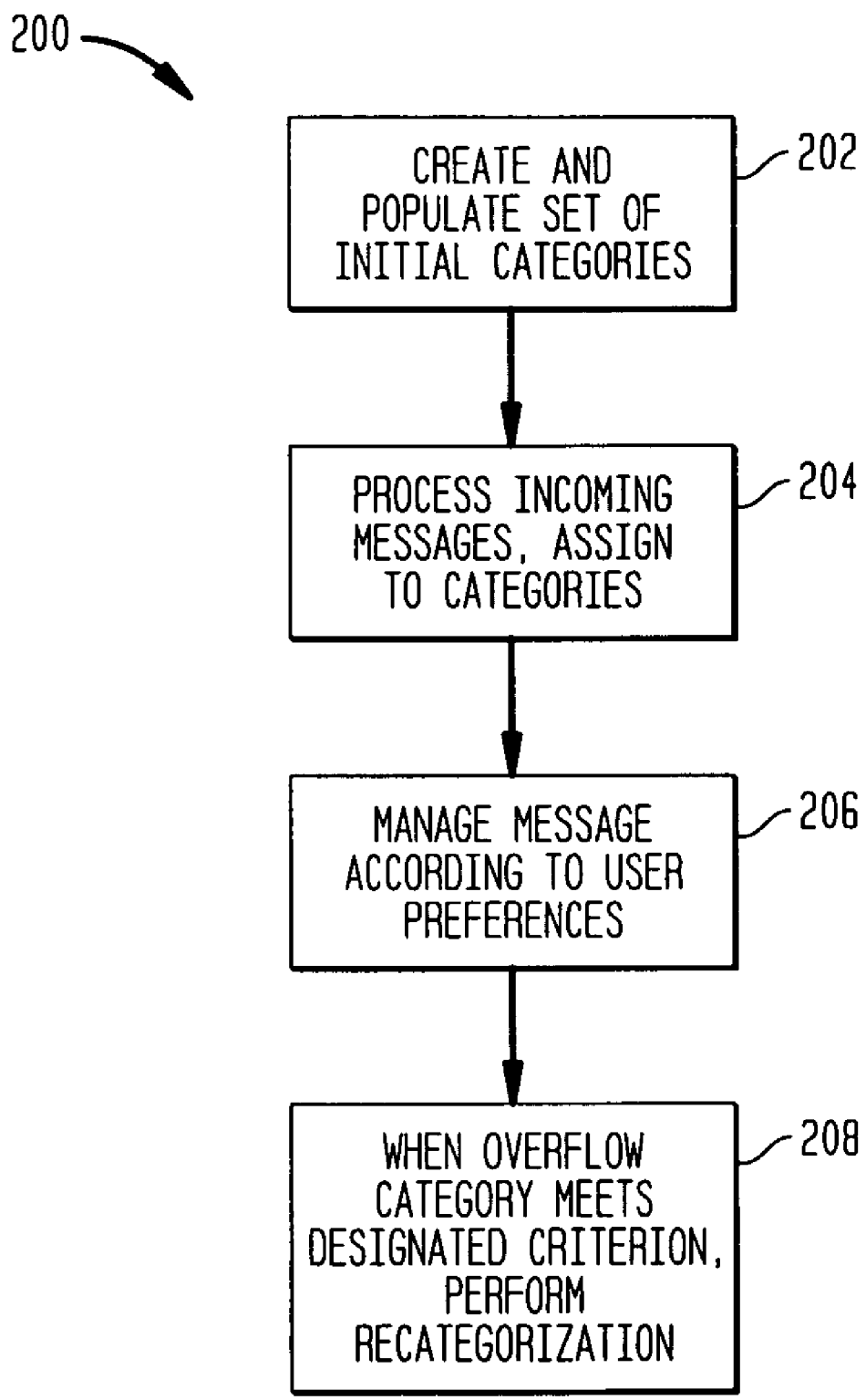
FIG. 2 illustrates a process of message categorization and routing according to an aspect of the present invention.

FIG. 2 illustrates a process 200 of category creation and message analysis according to an aspect of the present invention. At step 202, a set of initial categories is created and populated. The set of initial categories is suitably created through analysis of a corpus of messages and may be created manually by an operator, or automatically. Creation of the set of initial categories includes creation of an initially empty overflow category for messages that do not yet meet the standards for assignment to another category. Details of automatic creation and labeling of categories are described below in connection with the processes 300 and 400 of FIGS. 3 and 4, respectively. The process 300 performs an analysis of the initial corpus of messages to define message elements, or tokens, that can be compared to evaluate comparative similarity of different messages, the comparison of such tokens to define categories having maximum syntactic differences. The process 400 performs a selection of tokens to serve as category labels.

At step 204, as incoming messages arrive, the messages are processed and assigned to appropriate categories based on an analysis of syntactic similarities between the incoming messages and the messages already assigned to the different categories. Such analysis is described further below in connection the discussion of the processes 500 and 600 of FIGS. 5 and 6, respectively. Incoming messages that do not meet the criteria for assignment to a category are assigned to the overflow category. At step 206, each incoming message is managed according to user preferences for the category to which the message is assigned. For example, an incoming message may be rejected or given a higher or lower priority depending on user preferences for its category.

At step 208, whenever an overflow category meets a designated criterion, the messages in the category are evaluated and messages in the overflow category are reassigned. Reassignment may suitably include assignment of messages to appropriate ones of the established categories. Alternatively or in addition, new categories are created and messages in the overflow category are assigned to appropriate ones of the new categories. The designated criterion may suitably be based on a comparison of the number of messages in the overflow category against the number of messages in the established categories. For example, reassignment may be performed if the number of messages in the overflow category is greater than the average number of messages in the established categories. Creation of new categories is performed by analyzing the overflow category in a way similar to that used to create the initial categories in step 202, described above. Assignment of messages to existing categories is performed by analyzing the messages in a way similar to that used to assign incoming messages in step 204, described above.

In order to provide a specific example of the creation and initial population of message categories and the sorting of incoming messages into the categories, FIG. 3A illustrates a table 300 showing a set of initially created message categories 302-310.

The categories 302-310 were manually created, with messages manually sorted into the categories. Automatic category creation is also possible and would typically be used in actual practice, particularly in a large system with many users. Details of such creation are presented below. Typically, automatic category creation entails analysis of a large number of messages.

Sorting of messages into one of the categories above, or the overflow category, requires a comparison between elements of the incoming message, and elements of the messages in the category in which the incoming message is being considered for inclusion. FIG. 3B illustrates a table 350 showing six exemplary messages 352-362 that have been evaluated for inclusion in the categories presented in FIG. 3A.

Evaluation of the six messages 352-362 is accomplished by a comparison of elements of the messages against elements of the messages in the various categories. For example, the message 352 includes the character strings, "rental", "rent" and "negotiable". These strings, or portions of them, appear repeatedly in the "House Rentals" category 302, so the message 352 has been assigned to that category. The message 354 includes the strings "campsite" and "holiday", which appear in messages in the "Vacation Site Advertisements" category 3-4. The message 356 includes the strings "lamps" and "shades", which appear in messages in the "Collectors Items-Lampshades" category 306. The message 358 includes the strings "digitized" and "downloads", which appear in messages in the "Digitized Songs" category 308. The messages 360 and 362 do not contain strings which are considered to appear sufficiently often in any of the named categories, so they are placed in the "Overflow" category 310.

FIG. 4 illustrates a process 400 of automatic initial category creation, which may suitably be performed by the initial category creation module 122 of FIG. 1. The process 400 may be performed as part of step 202 of the process 200 of FIG. 2. At step 402, a number k of initial categories is specified, for example by receiving a selection or selections from a human operator. At step 404, a message m is selected at random and placed in the first category. At step 406, the message m is removed from the initial set of messages. At step 408, the remaining set of uncategorized messages is analyzed to determine the distance of each uncategorized message from the messages in each populated category. At step 410, the message having the greatest distance from messages in all populated categories is placed in a new category and removed from the set M. At step 412, the categories are examined to determine if the number of non empty categories is equal to the specified number k. If fewer than k non empty categories exist, the process returns to step 410. If k non empty categories exist, the process terminates at step 414.

The steps 408 and 410 of the process 400 focus on determining the syntactic distances between messages. Determination of syntactic distances is important in establishing message categories that are readily distinguishable and in assigning incoming messages to these categories, as will be discussed in greater detail below.

Numerous techniques exist for determining distances between messages, but one useful technique is the employment of a distance metric known as a token distance metric, based on the frequency of occurrence of selected elements, called tokens, appearing within the messages. A token may suitably be some combination of consecutive characters. Some number of characters is defined and a message is analyzed to identify all such combinations of characters. For example, a token may be defined as three consecutive characters. Such a token is referred to as a tri-gram, and the use of tokens consisting of three characters is commonly referred to as the tri-gram metric. All combinations of three consecutive characters are identified and used for comparison. For example, the word "kangaroo" includes the tri-grams "kan", "ang","nga","gar", "aro", and "roo". The use of such combinations provides a significant body of data for use in identifying similarities and differences between messages.

In determining syntactic distances between messages in the corpus 128, each of the messages in the corpus 128 is assigned a token signature. The token signature of a message is a vector of frequencies of tokens. The vector holds the number of occurrences of all defined tokens appearing in the message. As an example, the token signature of the message $m_1$ may be the vector $v_1$, and the signature of the message $m_2$ may be the vector $v_2$. The distance of the message $m_2$ from the message $m_1$ may be computed by normalizing the vectors $v_1$, and $v_2$ and taking the difference $v_2-v_1$, representing the subtraction of the vector $v_1$ from the vector $v_2$.

Once the initial creation of categories has been accomplished, the initial category creation module 122 proceeds to label the categories. Category labeling may be performed automatically. If category creation has been accomplished using the token distance metric discussed above, automatic labeling using message clustering may be performed to label the categories.

Figure 5:
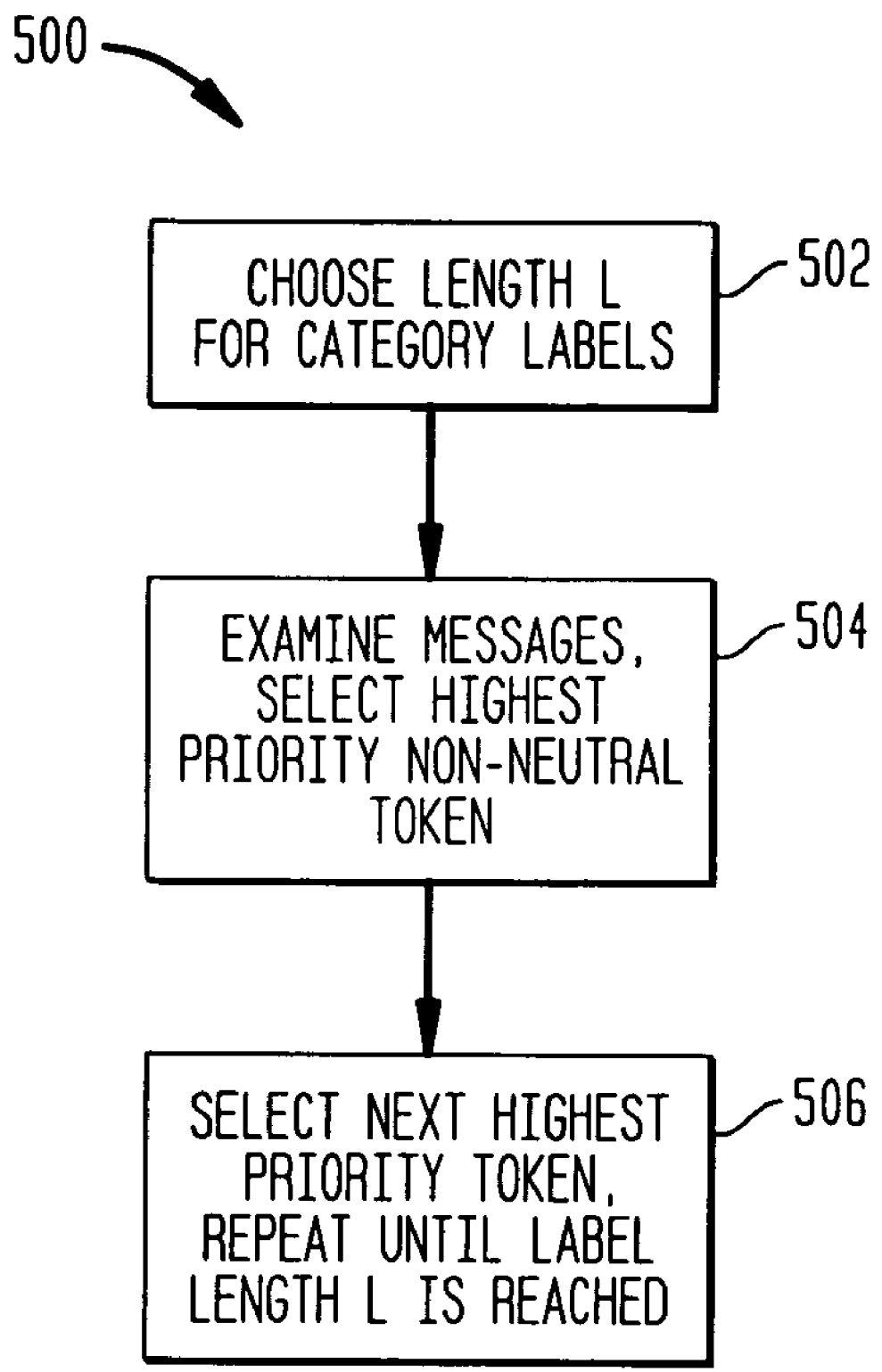
FIG. 5 illustrates a process of automatic category labeling according to an aspect of the present invention.

FIG. 5 illustrates the steps of a process 500 of automatic category labeling, suitably performed by the initial category creation module 122 of FIG. 1, after a set of categories has been created using the process 400 of FIG. 4. At step 502, a length L of each label is chosen. The value of L may suitably be a default value, or may be deliberately selected by a message service provider using a system such as the system 100 of FIG. 1. The value of L is stated in terms of tokens. For example, if the value of L is 3, each label is three tokens in length.

At step 504, the messages assigned to the category are examined and the tokens making up each message are identified. The highest priority non-neutral token is selected as the first token in the label. A neutral token is a token having little or no usefulness in distinguishing between messages, such as a commonly used connector word or portion of such a word. Connector words include the words "and," "or," "nor" and the like.

Suitably, priority for a token may be determined primarily by frequency of occurrence, with ties being broken using a lexicographic ordering. For example, if two tokens occur with equal frequency, the alphabetically first token may be selected. At step 506, the next highest priority non-neutral token is selected. Step 506 is repeated until the label has reached the desired length, at which point the process 500 terminates.

Figure 6:
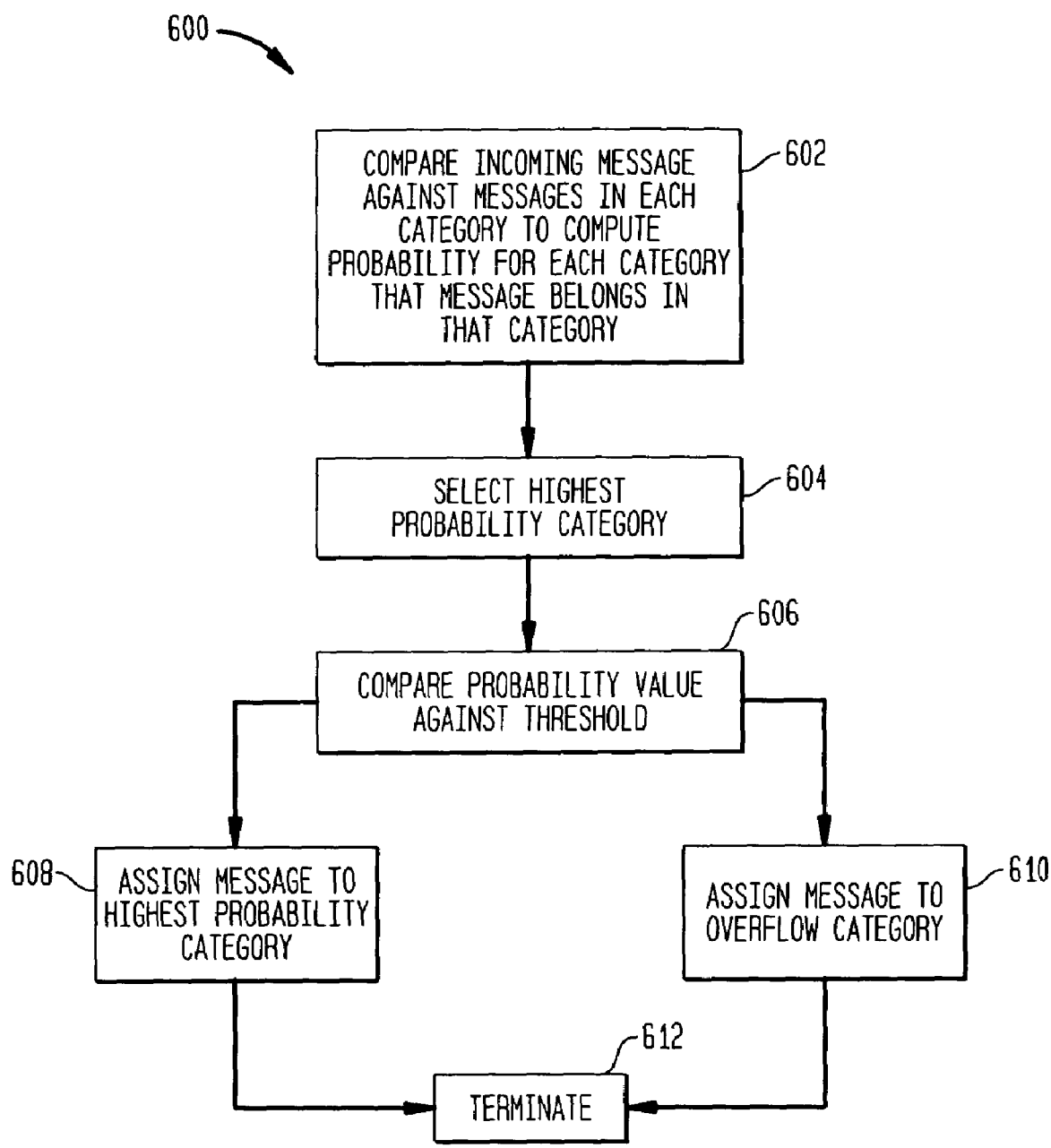
FIG. 6 illustrates a process of message analysis and category assignment according to an aspect of the present invention.

FIG. 6 illustrates the steps of a process 600 of message analysis and category assignment according to an aspect of the present invention. The process 600 may suitably be performed as the step 208 of the process 200, and may suitably be performed by the message categorization module 124 of FIG. 1. At the beginning of the execution of the process 600, categories have been defined and populated and tokens for each category have been identified.

At step 602, upon receipt of an incoming message, syntactic comparisons are made against the incoming message and the messages in each category, in order to compute for each category a probability that the message belongs to that category. Details of this computation are discussed further below in connection with FIG. 7. At step 604, the highest probability value is selected. At step 606, the selected probability value is compared against a threshold value. If the selected probability value meets the threshold value, the process proceeds to step 608 and the message is assigned to the established category for which the probability value was computed. If the selected probability value does not meet the threshold value, the process proceeds to step 610 and the message is assigned to the overflow category. In either case, the process then terminates at step 612.

Figure 7:
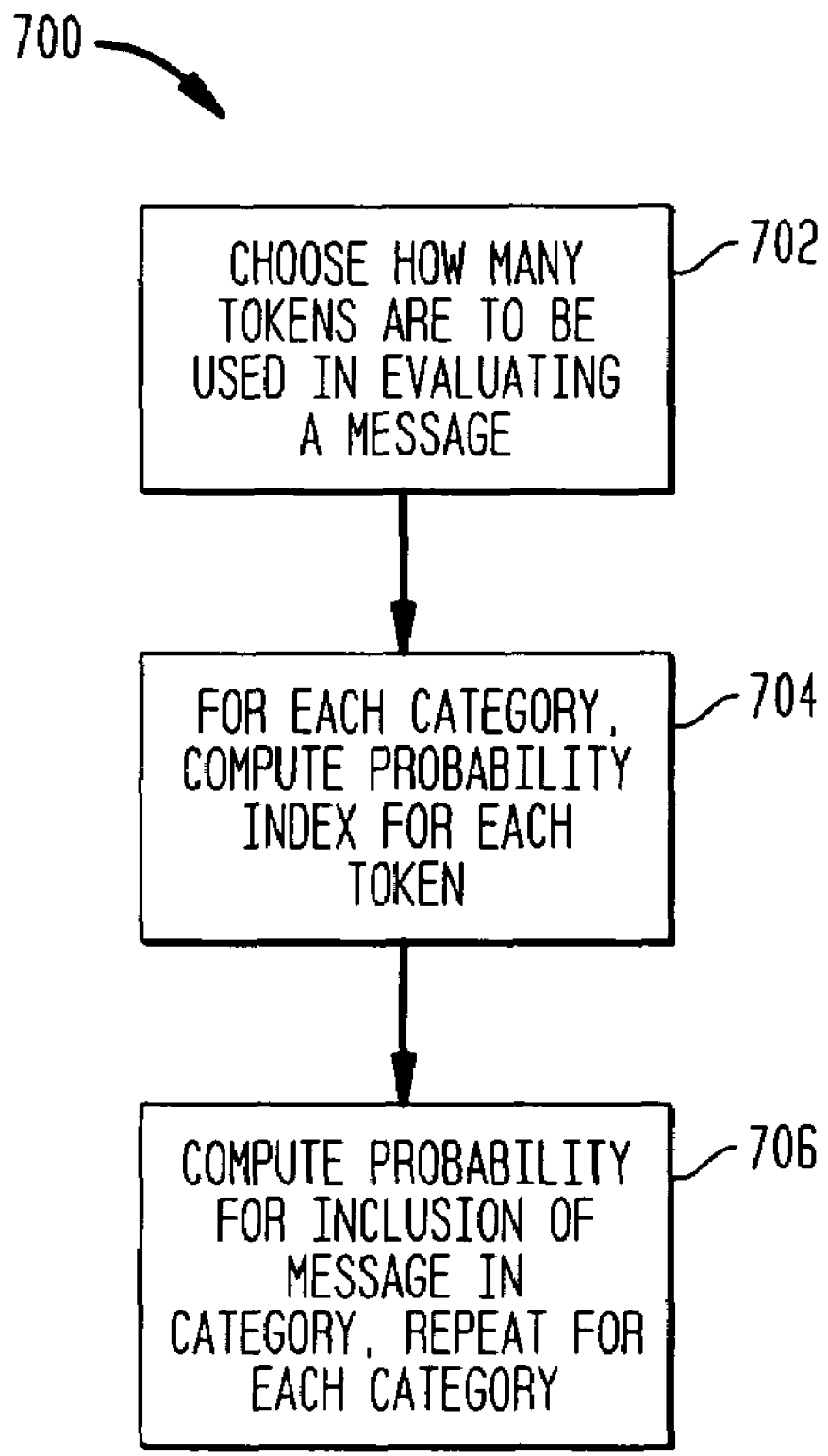
FIG. 7 illustrates a process of probability computation for assignment of messages to categories according to an aspect of the present invention.

FIG. 7 illustrates the steps of a process 700 of probability computation for inclusion of a message in a particular category, according to an aspect of the present invention. The process 700 assumes that message categories $A_1, A_2, \ldots, A_k$ have been defined. The value $NA_j(i)$ is the number of occurrences of token i in category $A_j$. The value $SA_j$ is the total number of messages in the category $A_j$. For each token i and category j, a token probability index $T_j(i)$ for token i with respect to category j is computed as follows:

$$T_j(i) = c$$

At step 702, a choice is made as to how many tokens are to be used in evaluating a message. For example, a choice may be made to use the 15 most relevant tokens in categorizing a message. At step 704, the probability index is computed for each token with respect to a category. At step 706, the overall probability for inclusion of the message in the category is computed as follows. The computation is expressed in terms of inclusion of message M in category $A_j$, with the q most relevant tokens being used. The computation is expressed as follows:

$$P_j(M) = \frac{T_j(1) * T_j(2) * \ldots T_j(q)}{T_j(1) * T_j(2) * \ldots T_j(q) + \sum_{\substack{l=1 \\ l \neq j}}^{k} T_l(1) * T_l(2) * \ldots T_l(q)},$$

where k is the total number of categories. Step 706 is repeated for each category $A_1, \ldots, A_k$, to compute the probability index for message M for each category.

While the present invention is disclosed in the context several embodiments, it will be recognized that a wide variety of implementations may be employed by persons of ordinary skill in the art consistent with the above discussion and the claims which follow below.

We claim:

1. A processor based system for categorizing text messages into established categories populated with messages, comprising:
    an incoming message categorization module for classifying incoming messages, the message categorization module being operative to examine elements of each incoming message to identify an appropriate category to which to assign the incoming message based on syntactic similarities and differences between the incoming message and messages already in the category, including messages that have previously been automatically assigned to the category by the incoming message categorization module;
    the incoming message categorization module assigning the incoming message to an established category previously established by an initial category creation module if predetermined criteria for syntactic similarity between the incoming message and one of the established categories are met; and
    the message categorization module assigning the incoming message to an overflow category if predetermined criteria are not met for syntactic similarity between the incoming message and one of the established categories.

2. The system of claim 1 further comprising:
    a category creation module operative to create said established categories for assignment of messages, the category creation module being operative to perform syntactic analysis on an initial corpus of messages to create clusters of messages, each message in a cluster of messages assigned to a category being chosen so as to having similar syntactic characteristics to other messages in the category and different syntactic characteristics from messages in other categories, the category creation module creating the established categories populated with messages from the initial corpus and also creating the overflow category which is initially empty.

3. The system of claim 1 further comprising:
    a recategorization module for periodically examining messages in the overflow category and using syntactic analysis to reassign messages in the overflow category to one of the established categories or to newly created categories.

4. The system of claim 1, wherein category creation is performed by assigning messages from the initial corpus to categories so as to create categories having a maximum achievable mutual syntactic distance.

5. The system of claim 4, wherein syntactic distance is evaluated by analyzing each message to identify tokens and calculating syntactic distance on the basis of frequency of tokens shared between messages.

6. The system of claim 5, wherein each token is a string of characters having a predetermined length.

7. The system of claim 6, wherein each token is a tri-gram.

8. The system of claim 5, wherein the category creation module is operative to label each category and wherein labeling of each category is performed by sequentially selecting and concatenating a predetermined number of tokens appearing in the category in descending order of priority, priority being assigned to tokens according to predetermined criteria, the criteria including frequency of occurrence.

9. The system of claim 1, wherein the incoming message categorization module is operative to categorize incoming messages by analyzing the incoming message to identify tokens appearing in the incoming message and calculating syntactic distance on the basis of tokens shared between the incoming message and messages in each of the categories.

10. A processor based system for categorizing text messages into established categories populated with messages, comprising:
    an incoming message categorization module for classifying incoming messages, the message categorization module being operative to examine elements of each incoming message to identify an appropriate category to which to assign the incoming message based on syntactic similarities and differences between the incoming message and messages in the category;

the incoming message categorization module assigning the incoming message to an established category if predetermined criteria for syntactic similarity between the incoming message and one of the established categories are met;

the message categorization module assigning the incoming message to an overflow category if predetermined criteria are not met for syntactic similarity between the incoming message and one of the established categories; and a recategorization module for periodically examining messages in the overflow category and using syntactic analysis to reassign messages in the overflow category to one of the established categories or to newly created categories, wherein the recategorization module is operative to perform recategorization when the number of messages in the overflow category is greater than the average number of messages in the established categories.

11. A processor based method of message categorization for categorizing messages into established categories populated with messages, the method comprising the steps of:

receiving incoming messages;

examining elements of each incoming message to identify an appropriate category to which to assign the incoming message based on syntactic similarities and differences between the incoming message and messages already in the category, including messages that have previously been automatically assigned to the category by an incoming message categorization module;

assigning the incoming message to an established category previously established by an initial category creation module if predetermined criteria for syntactic similarity between the incoming message and one of the established categories are met; and assigning the incoming messages to an overflow category if predetermined criteria are not met for syntactic similarity between the incoming message and one of the established categories.

12. The method of claim 11 further comprising:

analyzing an initial corpus of messages to create an initial set of categories for assignment of messages, analyzing the initial corpus of messages comprising analyzing syntactic characteristics of messages to create clusters of messages based on similarities of syntactic characteristics of messages in the same cluster and differences of syntactic characteristics between messages in different clusters, and assigning messages from the clusters to create categories to the established categories populated with messages, creation of the initial set of categories further comprising creation of an initially empty overflow category.

13. The method of claim 11 further comprising:

periodically examining messages in the overflow category and using syntactic analysis to reassign messages in the overflow category to one of the established categories or to newly created categories.

14. The method of claim 11, wherein the categories are created such that the categories have the maximum achievable mutual syntactic distance based on syntactic characteristics of messages assigned to each category.

15. The method of claim 14, wherein evaluating syntactic distance between messages includes analyzing each message to identify tokens in each message, assigning a token signature to each message and comparing token signatures of messages.

16. The method of claim 15, wherein the step of creating initial categories is followed by a step of labeling each category and wherein labeling of each category is performed by sequentially selecting concatenating a predetermined number of tokens appearing in the category in descending order of priority, priority being assigned to tokens according to predetermined criteria, the criteria including frequency of occurrence.

17. The method of claim 11, wherein the step of categorizing incoming messages comprises analyzing each incoming message to identify tokens appearing in the incoming message and calculating syntactic distance on the basis of tokens shared between the incoming message and messages in each of the categories.

18. The method of claim 17, wherein the step of calculating syntactic similarities and differences comprises computing probability values for inclusion of the message in each category.

19. A message control and routing center for receiving and routing text messages, comprising:

an interface for receiving and routing text messages a processor for analyzing and categorizing text messages and directing routing of text messages according to their categories; and a computer readable storage medium storing instructions directing operation of the processor in categorizing the text messages, the instructions comprising:

a category creation module operative to automatically create a set of initial categories for assignment of messages, the category creation module being operative to perform syntactic analysis on an initial corpus of messages to create clusters of messages, each message in a cluster of messages assigned to a category by the category creation module and being chosen so as to having similar syntactic characteristics to other messages in the category and different syntactic characteristics from messages in other categories, the category creation module being operative to create a plurality of established categories populated with messages from the initial corpus and an initially empty overflow category;

an incoming message categorization module for classifying incoming messages, the message categorization module being operative to examine elements of each incoming message to identify an appropriate category to which to assign the incoming message based on syntactic similarities and differences between the incoming message and messages in the category and to assign the incoming message to an established category if predetermined criteria for syntactic similarity between the incoming message and one of the established categories is met, the message categorization module being operative to assign the incoming message to the overflow category if predetermined criteria are not met for syntactic similarity between the incoming message and one of the established categories; and a recategorization module for periodically examining messages in the overflow category and using syntactic analysis to reassign messages in the overflow category to one of the established categories or to newly created categories.

20. The system of claim 19, wherein category creation is performed by assigning messages from the initial corpus to categories so as to create categories having a maximum achievable mutual syntactic distance.

* * * * *